United States Patent

Bachar et al.

(10) Patent No.: US 8,650,219 B2
(45) Date of Patent: Feb. 11, 2014

(54) PERSISTENT ITERATION OVER A DATABASE TREE STRUCTURE

(75) Inventors: Yariv Bachar, Kibbutz Ma'abarot (IL); Aviv Kuvent, Raanana (IL); Asaf Levy, Rishon le Zion (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/489,390

(22) Filed: Jun. 5, 2012

(65) Prior Publication Data

US 2013/0325902 A1 Dec. 5, 2013

(51) Int. Cl.
*G06F 7/00* (2006.01)
*G06F 17/30* (2006.01)

(52) U.S. Cl.
USPC .................................................. 707/797

(58) Field of Classification Search
USPC .................. 707/692, 769, 795, 797
See application file for complete search history.

(56) References Cited

U.S. PATENT DOCUMENTS

| | | | |
|---|---|---|---|
| 6,978,271 B1 | 12/2005 | Hoffman et al. | |
| 7,082,438 B2 | 7/2006 | Najork et al. | |
| 7,155,440 B1 * | 12/2006 | Kronmiller et al. | 707/797 |
| 7,373,340 B2 | 5/2008 | Sauermann et al. | |
| 7,630,998 B2 | 12/2009 | Zhou et al. | |
| 7,827,219 B2 | 11/2010 | Chowdhury | |
| 8,010,577 B1 | 8/2011 | Tibbett | |
| 8,078,642 B1 * | 12/2011 | Poutanen | 707/797 |
| 8,170,962 B2 | 5/2012 | Lim et al. | |
| 2004/0017783 A1 * | 1/2004 | Szentesi et al. | 370/256 |
| 2005/0262080 A1 * | 11/2005 | Kolman et al. | 707/9 |
| 2006/0095456 A1 | 5/2006 | Sakai et al. | |
| 2006/0282439 A1 * | 12/2006 | Allen et al. | 707/100 |
| 2010/0030752 A1 * | 2/2010 | Goldentouch | 707/3 |
| 2010/0077352 A1 * | 3/2010 | Heer et al. | 715/821 |
| 2010/0228783 A1 * | 9/2010 | Castellanos et al. | 707/797 |
| 2010/0250611 A1 | 9/2010 | Krishnamurthy | |
| 2011/0010347 A1 * | 1/2011 | Cheriton et al. | 707/692 |
| 2011/0016153 A1 * | 1/2011 | Atta et al. | 707/797 |
| 2011/0035376 A1 * | 2/2011 | Kirshenbaum | 707/737 |
| 2011/0145295 A1 * | 6/2011 | Veksler | 707/797 |
| 2011/0202570 A1 * | 8/2011 | Zina | 707/797 |
| 2011/0270889 A1 * | 11/2011 | Stevens et al. | 707/797 |
| 2011/0302198 A1 | 12/2011 | Baby et al. | |
| 2012/0047180 A1 * | 2/2012 | Kirshenbaum | 707/797 |

OTHER PUBLICATIONS

Dahan, Sylvain; "Distributed Spanning Tree Algorithms for Large Scale Traversal".
Fiat et al., "Making Data Structures Confluently Persistent".

* cited by examiner

*Primary Examiner* — Robert Beausoliel, Jr.
*Assistant Examiner* — Nicholas Allen
(74) *Attorney, Agent, or Firm* — Griffiths & Seaton PLLC

(57) ABSTRACT

Persistent iteration is performed in stages on nodes arranged according to a node identification (ID) that is increasing in order under a parent node in database tree structure. While performing the persistent iteration, storing a start node ID of the node where the persistent iteration commenced, a current node ID of the node that is undergoing the persistent iteration, a parent node ID of the node that is undergoing the persistent iteration, and a numerical value representing the current level and all levels greater than the current level of nodes that are undergoing the persistent iteration. Upon completion of the persistent iteration on the nodes that are the children of the node with the parent node ID, returning to the first node among the children of the node with the parent node ID, as ordered by increasing node ID, and performing the persistent iteration for children nodes of each node.

21 Claims, 6 Drawing Sheets

PERSISTENT ITERATION OVER A DATABASE TREE STRUCTURE

BACKGROUND OF THE INVENTION

1. Field of the Invention

The present invention relates generally to computers, and more particularly, to persistent iteration over a database tree structure.

2. Description of the Related Art

In today's society, computer systems are commonplace. Computer systems may be found in the workplace, at home, or at school. Computer systems may include data storage systems, or disk storage systems, to process and store data. Within various computing environments, computer systems may have a data model in which the data is organized into a tree-like structure. Due to various factors, challenges arise in traversing over the tree structure.

SUMMARY OF THE INVENTION

As mentioned above, a data model may be designed as a hierarchical database model in which the data is organized into a tree-like structure. The structure allows representing information using parent/child relationships; each parent (e.g., a parent node) can have many children (e.g., a child node), but each child has only one parent. A tree structure, having one or more levels, implemented over a database is a way to combine the advantages provided by a tree data structure, namely the hierarchical order, and the advantages of a database, namely scalability, transactional efficiency and data persistency. The concept of a database tree structure allows implementing solutions, which inherently require a tree structure, such as a file system, over a database. In order to take full advantage of the hierarchical nature of a tree structure, it is necessary to provide a method for traversing (e.g., iterating) over the tree structure.

Accordingly, and in view of the foregoing, various exemplary method, system, and computer program product embodiments for persistent iteration over a database tree structure are provided. In one embodiment, by way of example only, a persistent iteration is performed in stages on nodes arranged according to a node identification (ID) that is increasing in order for each group of node children (nodes which share the same parent node). While performing the persistent iteration, storing in an iterator the start node identification (ID) of the nodes where the persistent iteration commenced, the current node identification (ID) of the node up to where the iterations have performed thus far, the parent node identification (ID) of the current node, and a numerical value representing the current level and all levels greater than the current level of nodes that are undergoing the persistent iteration. Upon completion of the persistent iteration on the nodes, which are the children of the node with the parent node ID currently stored in the iterator, returning to the first node among the children of the node with the parent node ID, as ordered by increasing node ID, and performing the persistent iteration for the children node for each of these nodes.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
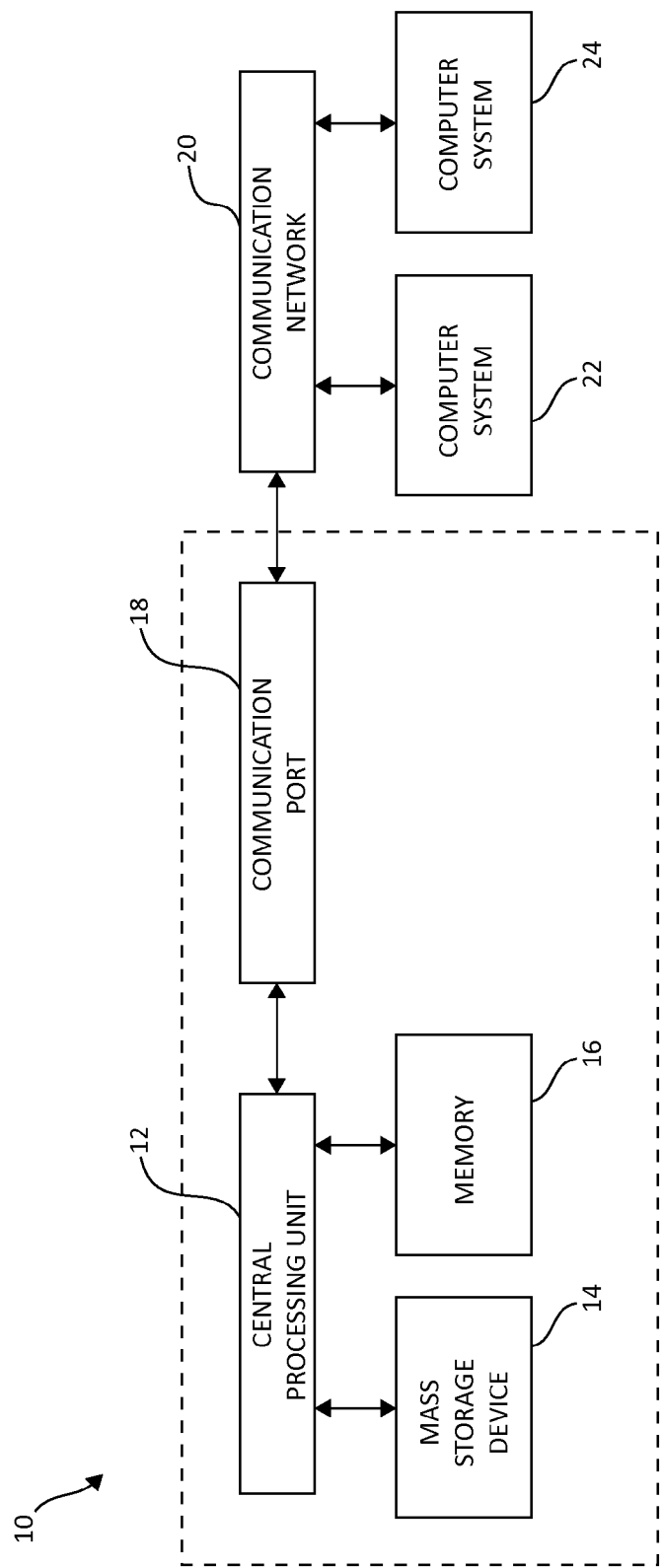
FIG. 1 is a block diagram illustrating a computing system environment having an example storage device in which aspects of the present invention may be realized.

Throughout the following description and claimed subject matter, the following terminology, pertaining to the illustrated embodiments, is described. A "Strict Order Relation" is intended to refer to a binary relation, which is asymmetric and transitive (e.g. "greater than" relation). A "Node Identification" ID) is intended to refer to a unique identification (ID) used as the key of an entry in the Database. The node IDs are generated using a strictly increasing (monotonic) function over time.

It should be noted that the definitions described herein are applicable to the illustrated embodiments by way of example, and other definitions, as commonly understood in the art, may be applicable as well for describing the functionality and purpose of the illustrated embodiments of the present invention.

Within a computing environment, databases are flat (tablature) structures, and by nature, are not hierarchical. Hence, a tree structure, implemented over a database, is a way to combine the advantages provided by a tree data structure, namely the hierarchical order, and the advantages of a database, namely scalability, transactional efficiency and data persistency. Currently, there are several ways to implement a tree structure over a database, each way providing different options for traversal over the tree. However, a need exists for implementing a tree structure over a database and allowing for continued traversal of the tree structure over the database following system failures (e.g. a server crash). In order to meet the need for continued traversal of the tree structure over the database following a system failure, the following are required. 1) Allowing for iterations over the tree structure by using the tree implementation in the database. 2) Providing persistency by storing the state of the iterator to a disk and using this saved state to continue iterating after system failure. 3) Providing efficient continuity of the iteration by relying on strict-order relations between the node ID's (the current node ID is also stored). Then, using an appropriate database query, the iteration may be continued from the current node by simply traversing over the remaining nodes in the level which has node ID's that are greater than the current node ID and which have a parent node ID identical to the one stored in the iterator. 4) Providing for the ability to traverse over a tree of any size. 5) Providing independence of the tree size by an iterator storing the same set of fixed number of numeric values, which define the state of the iterator, regardless of the tree size.

As will be described below, the illustrated embodiments provide a solution for a persistent iteration over a tree structure implemented in a database, satisfying all requirements described above. The persistent iteration over a tree structure implemented in a database is preserved at a given point. In the event of a system failure, the persistent iteration may then be performed from the given point that is preserved. In other words, following a system failure, in an embodiment where the tree structure over the database is represented by having each node in the tree reference the node's parent node, continued traversal of the tree structure can be achieved by storing the state of the iterator (the current node ID, the parent node ID of the current node, the start node ID and the numerical values representing the levels) and by relying on the strict order relation between node IDs.

In one embodiment, the iteration process may be performed using a predetermined set of queries on the database. During the persistent iteration, the iterator stores the start node ID where the iteration commenced (e.g., the root node of the tree or sub-tree), the current node ID of the node currently under iteration, the parent node ID of the current node and a numeric value representing the current level and levels greater than (higher) the current level in the tree (where the level of the start node is regarded as level 0). (It should be noted that the node ID's stored in the iterator also exist in the database as the keys of the database entries for the relevant nodes).

During the iteration process the nodes are traversed. The nodes which share the same parent node are ordered by the node's unique node ID's, which are increasing in order, and the required operation on each of these nodes, is performed. In the case of a simple iteration, the required operation will simply be returning to the user the next node ID in the iteration. However, the illustrated embodiments may also allow for the iterator to perform any operation on the node, as long as the operation doesn't change the tree structure (for example, as it relates to a file system, the required operation can be changing the name of the file/directory on which the is currently being iterated without changing the file/directory's parent node and without changing the file/directory's node ID). After performing the iteration operation on all of the nodes that share the same parent node, the illustrated embodiments may return to the first node among the children nodes of the current parent node (in the order of the unique nodes ID's) and perform the iteration process on the children of the first node. This process is recursively performed for each node among the children nodes of the current parent node having at least one child. Thus, a type of Depth First Search (DFS) traversal (which is not a conventional DFS iteration) is achieved, since the iteration operation is performed on all of the nodes of the current level, which have the same parent node before proceeding to the next level. After recursively completing the iteration process on all the children nodes of the current parent node, the illustrated embodiment may move to a node which is a "sibling" of the current parent node or move up the tree using the fact that each node database entry references the node's parent node by containing the unique node ID of the parent node.

The iteration is performed under the assumption that the database tree structure does not change during the iteration process, which may be achieved via several methods. For example, the assumptions are realized by taking a snapshot of the database table or by avoiding any changes to the database tree structure during the tree traversal.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
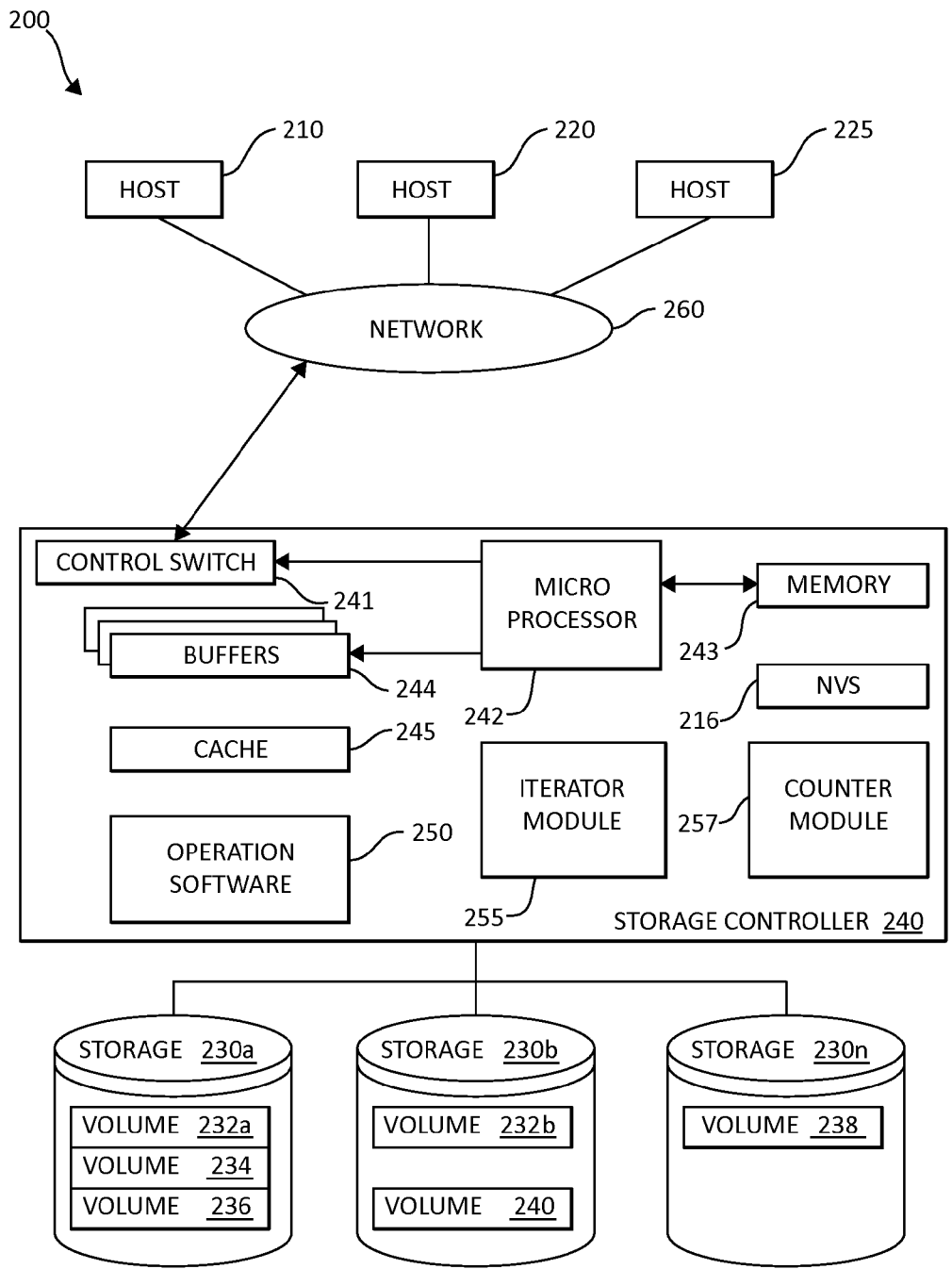
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include an iterator module 255 and a counter module 257. The iterator module 255 and the counter module 257 may work in conjunction with each and every component of the storage controller 240, the hosts 210, 220, 225, and storage devices 230. The iterator module 255 and the counter module 257 may be structurally one complete module or may be associated and/or included with other individual modules. The iterator module 255 and the counter module 257 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, the iterator module 255 and the counter module 257, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network adaptor (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, iterator module 255 and the counter module 257 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the iterator module 255 and the counter module 257 may also be located in the cache 245 or other components. The RAM (random access memory) is the place in a computer where the operating system, application programs, and data in current use are kept so that they can be quickly reached by the computer's processor 242. The RAM is much faster to read from and write to than the other kinds of storage in a computer, the hard disk, floppy disk, and CD-ROM. As such, one or more RAM may be used by and for the iterator modules 255 and counter modules 257 as needed, based upon the storage architecture and users preferences.

Figure 3:
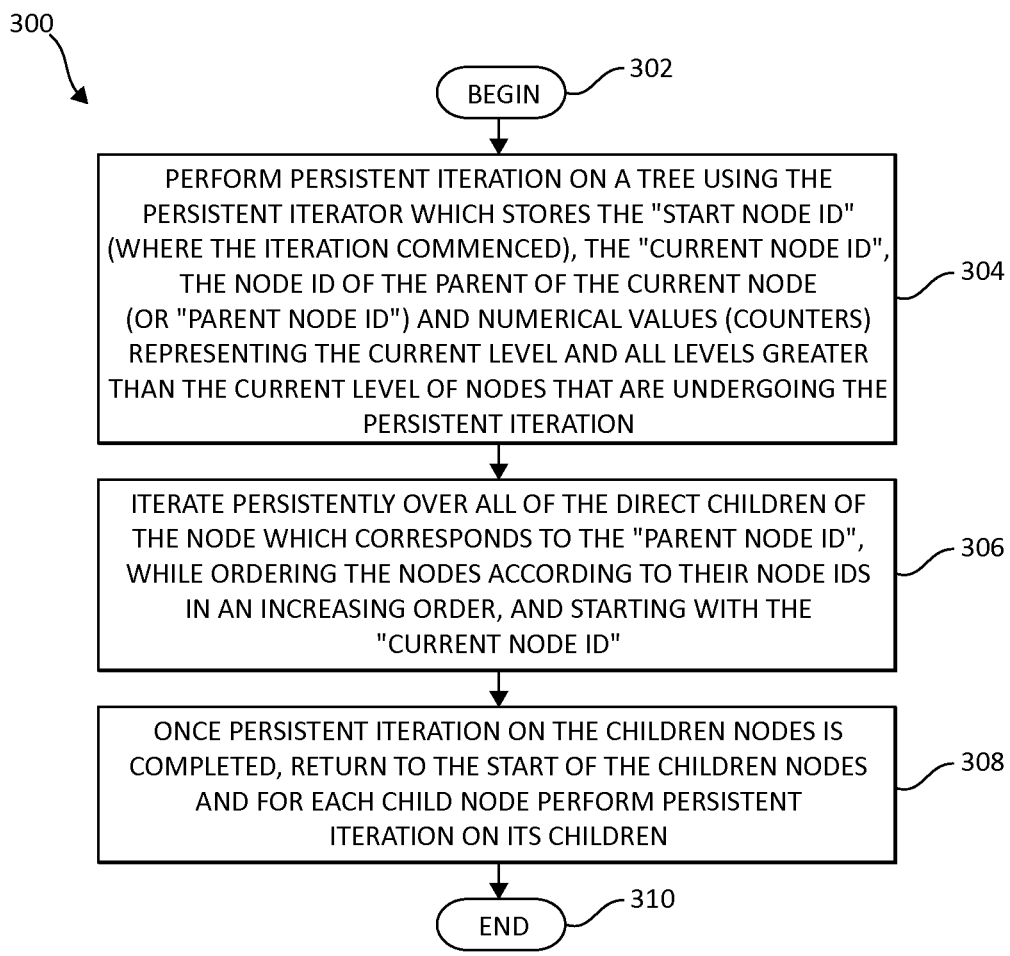
FIG. 3 is a flow chart diagram illustrating a method for performing persistent iteration over a database tree structure.

Turning now to FIG. 3, a flow chart diagram illustrating a method 300 for performing persistent iteration over a database tree structure is depicted. The method 300 begins (step 302) by performing persistent iteration on a tree using the persistent iterator which stores the start node ID (where the iteration commenced), the current node ID, the node ID of the parent of the current node (e.g., the parent node ID), and numerical values (counters) representing the current level and all levels greater than the current level of nodes that are undergoing the persistent iteration (step 304). The method 300 may persistently iterate over all the direct children of the node that corresponds to the parent node ID, while ordering the nodes according to the node IDs in an increasing order, and starting with the current node ID (step 306). Upon completion of the persistent iteration on the children nodes, the method 300 may return to the start of the children nodes, and for each child node, perform persistent iteration on the children nodes of each child node (step 308). The method 300 ends (step 310).

In one embodiment, the iterator may be initialized by providing the iterator with a start node ID (the node ID of the root node of the tree or sub-tree on which the iteration is performed). At the start of the iteration process, the root of the tree is first handled separately than the rest of the levels of the tree. The root node receives unique handling in order to allow for cases where the iteration is to be performed over a sub-tree. In these cases the root node might have sibling nodes (nodes which share the same parent node) in the tree, over which there is no intention to perform the iteration. Since the iterator receives the start node of the iteration, a different iterator may be defined and given, as the start node, the parent node of the root node of the current iterator (or some other ancestor of the root node). This new iterator will be interested in the sibling nodes of the root node of the current iterator.

In other words, if the database contains a tree, but it is desired to iterate only over part of a tree (e.g., only on a sub-tree) the iterator is provided with the node ID of the root of the sub-tree as the start node ID. Looking at the entire tree, this node might have siblings (nodes who have the same parent node) in the tree, but it is not intended (desired) for the iterator to access these siblings. Since the normal iteration flow includes performing an operation on all the nodes, which have the same parent, this normal iteration flow cannot be used to handle the root of the sub-tree. Thus, as mentioned above, the root node receives unique handling for performing the operation only on a single node—the root node.

After performing the required operation on the root of the tree, the iteration process begins on the rest of the tree by initializing the inner state of the iterator as follows. 1) The parent node ID is initialized to be the start node ID. 2) The current node ID is initialized to the minimal node ID value. 3) The counter for the "previous level" is initialized to 0 and the counter for "current level" is initialized to 1.

Figure 4:
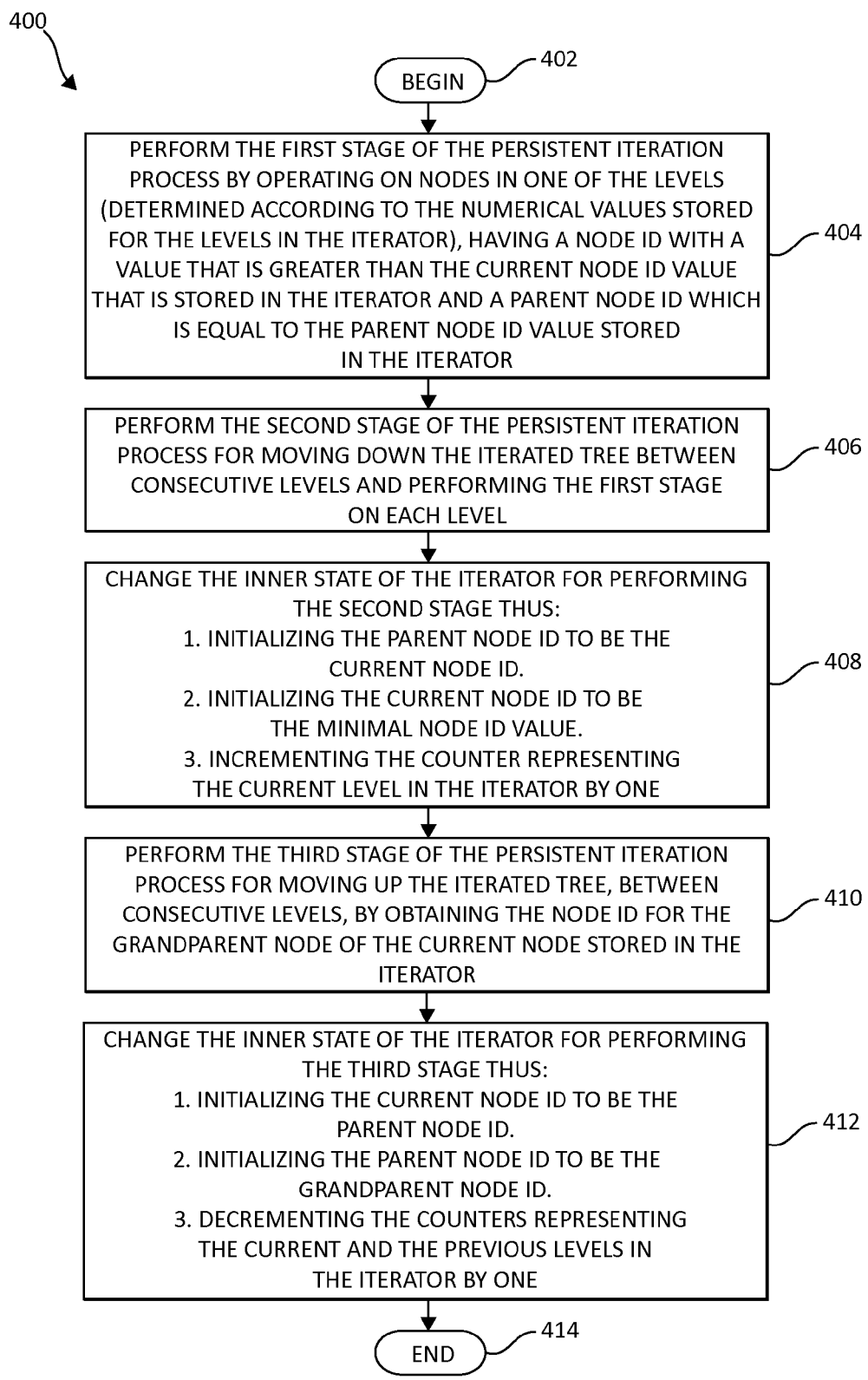
FIG. 4 is a flow chart diagram illustrating a method for performing persistent iterations in stages.

As will be described below in FIG. 4, the iteration process may be comprised of three main stages: 1) operating on nodes in a level, 2) moving down a level of the database tree structure, and 3) moving up a level of the database tree structure. Turning now to FIG. 4, a flow chart diagram illustrating a method for performing persistent iterations in stages is depicted. The method 400 begins (step 402) by performing a first stage of the persistent iteration process by operating on nodes in one of the levels (determined according to the numerical values stored for the levels in the iterator), having a node ID with a value that is greater than the current node ID value that is stored in the iterator and a parent node ID that is equal to the parent node ID value stored in the iterator (step 404). The operation on nodes in a level may be performed using a database query. The method 400 may operate on the nodes in a level that have a node ID value that is greater than the current node ID values stored in the iterator. The method 400 may perform this stage several times, since a user may not be able to handle all of the level's nodes at once. The user can choose to store the iterator at any point in the iteration.

Next, the method 400 may perform the second stage of the persistent iteration process for moving down the iterated tree between consecutive levels and performing the first stage on each level (step 406). The operation for moving down a level may be performed using a database query. The method 400 may change the inner state in the iterator for performing the second stage thus 1) initializing the parent node ID to the current node ID, 2) initializing the current node ID to the minimal node ID value, and 3) incrementing the counter representing the current level in the iterator by a value of one (step 408).

The method 400 may perform a third stage of the persistent iteration process for moving up the iterated tree, between consecutive levels, by obtaining the node ID of the grandparent node of the current node stored in the iterator (step 410). The operation for moving up a level may be performed using a database query. The method 400 may change the inner state of the iterator for performing the third stage thus 1) initializing the current node ID to be the parent node ID, 2) initializing the parent node ID to be the grand parent node ID, and 3) decrementing the counters representing the current and previous levels in the iterator by a value of one (step 412). The method ends (414).

In order to determine which of the stages to perform, the following operations may be performed. If the counter (e.g., a counter maintaining a numerical value) of the current level is different than the counter of the previous level counter, the first stage is performed and operates on the nodes in that particular level, with the parent node, which has the same node ID as the parent node ID stored in the iterator. If there are no further existing nodes in the level, under the current parent node, to perform the persistent iteration upon, the value of the counter for the previous level is changed and set equal to the value of the current level counter. If the current level and the previous level counters are equal, and the previous level counter also equals 0, the persistent iteration may be terminated, since the iteration operations over the tree are finished. If the current level and the previous level counters are equal, and the previous level counter does not equal 0, a re-iteration operation is performed over the nodes in the current level (and under the current parent node), which contain at least one child node. If there are nodes in the current level (and under the current parent node) that contain at least one child node, the second stage may be performed by moving down a level. If there are no nodes in the current level, under the current parent node, which contain child nodes, the third stage may be performed by moving up a level. These operations are further described below in FIG. 5.

Figure 5:
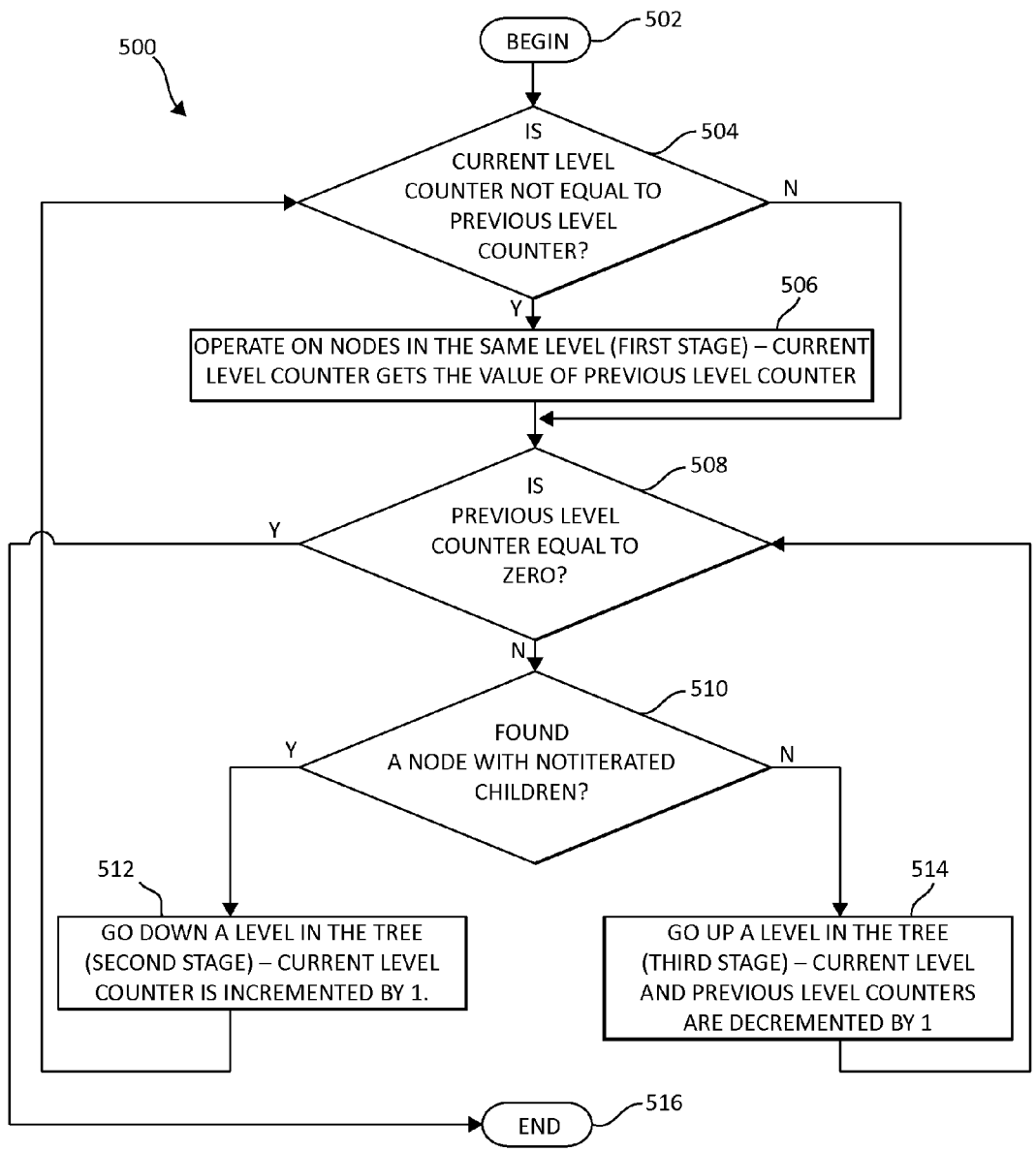
FIG. 5 is a flow chart diagram illustrating a method for determining which stage to perform at each point during the persistent iteration.

FIG. 5 is a flow chart diagram illustrating a method 500 for determining which stage to perform at each point during at each point during the persistent iteration. The method 500 begins (step 502) by determining if the current level counter (e.g., numerical value) is not equal to the previous level counter (step 504). If no, the method 500 moves to step 508. If yes, the method 500 operates on nodes in the same level (the first stage) and the current level counter receives the value of the previous level counter (see FIG. 4, step 404) (step 506). The method 500 determines if the previous level counter equal to zero (step 508). If the previous level counter is not equal to zero, the method 500 determines if a node is found having children that are not iterated (step 510). If the method 500 does find a node having children that are not iterated (e.g., a node having children nodes that are not yet persistently iterated over), the method 500 will go down a level in the tree (second stage) and the current level counter is incremented by a value of 1 (step 512). The method 500 then returns to step 504. If the method 500 does not find a node having children that are not iterated (e.g., a node having children nodes that have been persistently iterated over), the method 500 may go up a level in the tree (third stage) and the current and previous level counters are decremented by a value of 1 (step 514). The method then returns to step 508. Returning to step 508, if the previous level counter is equal to zero, the method 500 may end (step 516).

Figure 6:
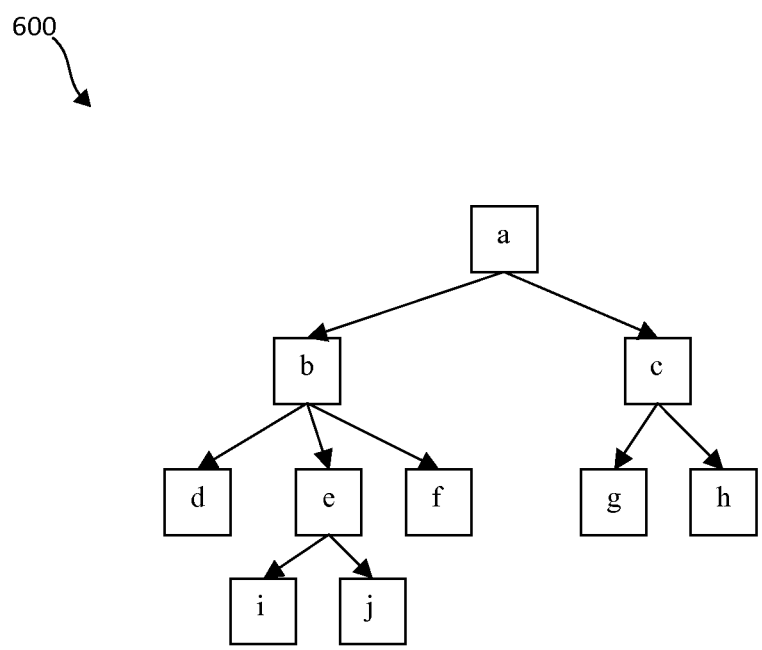
FIG. 6 is a block diagram illustrating an exemplary iteration process over a tree structure.

FIG. 6 is a block diagram 600 illustrating an exemplary iteration process over a tree structure. As illustrated in the tree, the persistent iterator, utilizing the embodiments described above, will iterate on each of the levels in the tree in the following order: a, b, c, d, e, f, i, j, g and h. Note that the persistent iterator will iterate i and j before iterating over g and h since the iterator does not work on all the nodes in a level, but rather moves on to the next level, and the persistent iterator "jumps" back and forth between levels.

The above-described embodiments for persistently iterating over a database-implemented tree structure may be applied to a variety of application including, but not limited to, scanning a files-systems' directory tree. The illustrated embodiments also allows for persistent iteration over a tree, regardless of the size of the tree, and to continue the iteration after system failures without the need to re-scan the result set returned from the queries on the tree.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for persistent iteration over a database tree structure having a plurality of levels by a processor device in a computing environment, the method comprising:
    performing on a current level a first stage of the persistent iteration on those of the plurality of nodes having at least a node identification (ID) greater than a current node identification (ID) that is stored and a parent node identification (ID) equal to a parent node identification (ID) that is stored, wherein each of the plurality of nodes share a parent node and are increasingly ordered according to the node ID of each of the plurality of nodes; wherein:
    the first stage of the persistent iteration is performed if the numerical value of the current level is not equal to the numerical value of a previous level, further wherein the numerical value of the previous level is set equal to the numerical value of the current level if all of the plurality of nodes in a current level under a same parent node had the first stage of the persistent iteration performed thereon,
    the persistent iteration is terminated if the numerical value of the current level and the numerical value of the previous level are equal and the numerical value of the previous level equals zero, and
    if the numerical value of the current level and the numerical value of the previous level are equal and the numerical value of the previous level does not equal zero, at least one of:
        a second stage of the persistent iteration is performed on one of the plurality of levels having those of the plurality of nodes with at least one child node not yet having the first stage of the persistent iteration performed thereon, and
        a third stage of the persistent iteration is performed on one of the plurality of levels having those of the plurality of nodes with all child nodes having the first stage of the persistent iteration performed thereon.

2. The method of claim 1, further including storing during the first stage of the persistent iteration at least a start node identification (ID) of one of the plurality of nodes indicating where the persistent iteration commenced, a current node identification (ID) of one of the plurality of nodes that is undergoing the persistent iteration, a parent node identification (ID) of the one of the plurality of nodes that is undergoing the persistent iteration, and a numerical value corresponding to at least the current level and those of the plurality of levels greater than the current level.

3. The method of claim 2, further including initializing the start node ID to be a root of one of at least the database tree structure and a sub-tree of the database tree structure.

4. The method of claim 2, further including performing the first stage of the persistent iteration by at least one of:
    initializing the parent node ID to be the start node ID,
    initializing the current node ID to a minimal node ID value, and
    initializing the numerical value for a pervious level to a zero value and the numerical value for the current level to a first value.

5. The method of claim 1, further including performing during the second stage of the persistent iteration at least one of:
    initializing the parent node ID to be the current node ID, initializing the current node ID to a minimal node ID value, and incrementing the numerical value for the current level by a value of one.

6. The method of claim 1, further including obtaining the node ID for a grandparent node of the current node ID during the third stage of the persistent iteration.

7. The method of claim 1, further including performing during the third stage of the persistent iteration at least one of:
    initializing the current node ID to be the parent node ID, initializing the parent node ID to be a grand parent node ID, and
    decrementing the numerical value for the current level and the numerical value for a previous level by a value of one.

8. A system for persistent iteration over a database tree structure having a plurality of levels in a computing environment, the system comprising:
    an iterator used in the persistent iteration in levels in the data base tree;
    a plurality of counters for maintaining a numerical value for each of the plurality of levels, wherein the plurality of counters is in communication with the iterator,
    at least one processor device in communication with the iterator and the plurality of counters, wherein the processor device is adapted for:
    performing on a current level a first stage of the persistent iteration on those of the plurality of nodes having at least a node identification (ID) greater than a current node identification (ID) stored in the iterator and a parent node identification (ID) equal to a parent node identification (ID) stored in the iterator, wherein each of the plurality of nodes share a parent node and are increasingly ordered according to the node ID of each of the plurality of nodes; wherein:
        the first stage of the persistent iteration is performed if the numerical value of the current level is not equal to the numerical value of a previous level, further wherein the numerical value of the previous level is set equal to the numerical value of the current level if all of the plurality of nodes in a current level under a same parent node had the first stage of the persistent iteration performed thereon,
        the persistent iteration is terminated if the numerical value of the current level and the numerical value of the previous level are equal and the numerical value of the previous level equals zero, and
        if the numerical value of the current level and the numerical value of the previous level are equal and the numerical value of the previous level does not equal zero, at least one of:
            a second stage of the persistent iteration is performed on one of the plurality of levels having those of the plurality of nodes with at least one child node not yet having the first stage of the persistent iteration performed thereon, and
            a third stage of the persistent iteration is performed on one of the plurality of levels having those of the plurality of nodes with all child nodes having the first stage of the persistent iteration performed thereon.

9. The system of claim 8, wherein the processor device is further adapted for storing in the iterator during the first stage of the persistent iteration at least a start node identification (ID) of one of the plurality of nodes indicating where the persistent iteration commenced, a current node identification (ID) of one of the plurality of nodes that is undergoing the persistent iteration, a parent node identification (ID) of the one of the plurality of nodes that is undergoing the persistent iteration, and a numerical value corresponding to at least the current level and those of the plurality of levels greater than the current level.

10. The system of claim 9, wherein the processor device is further adapted for initializing in the iterator the start node ID to be a root of one of the database tree structure and the sub-tree of the database tree structure.

11. The system of claim 9, wherein the processor device is further adapted for initializing the iterator, for performing the first stage of the persistent iteration, by performing at least one of:
    initializing the parent node ID to be the start node ID,
    initializing the current node ID to a minimal node ID value, and
    initializing the numerical value for a pervious level to a zero value and the numerical value for the current level to a first value.

12. The system of claim 8, wherein the processor device is further adapted for initializing the iterator, for performing the second stage of the persistent iteration, by performing at least one of:
    initializing the parent node ID to be the current node ID,
    initializing the current node ID to a minimal node ID value, and
    incrementing the numerical value for the current level by a value of one.

13. The system of claim 8, wherein the processor device is further adapted for obtaining the node ID for a grandparent node of the current node ID during the third stage of the persistent iteration.

14. The system of claim 8, wherein the processor device is further adapted for initializing the iterator, for performing a third stage of the persistent iteration, by performing at least one of:
    initializing the current node ID to be the parent node ID,
    initializing the parent node ID to be a grand parent node ID, and
    decrementing the numerical value for the current level and the numerical value for a previous level by a value of one.

15. A computer program product for persistent iteration over a database tree structure having a plurality of levels by a processor device, the computer program product comprising a non-transitory computer-readable storage medium having computer-readable program code portions stored therein, the computer-readable program code portions comprising:
    a first executable portion for performing on a current level a first stage of the persistent iteration on those of the plurality of nodes having at least a node identification (ID) greater than a current node identification (ID) that is stored and a parent node identification (ID) equal to a parent node identification (ID) that is stored, wherein each of the plurality of nodes share a parent node and are increasingly ordered according to the node ID of each of the plurality of nodes; wherein:
        the first stage of the persistent iteration is performed if the numerical value of the current level is not equal to the numerical value of a previous level, further wherein the numerical value of the previous level is set equal to the numerical value of the current level if all of the plurality of nodes in a current level under a same parent node had the first stage of the persistent iteration performed thereon,
        the persistent iteration is terminated if the numerical value of the current level and the numerical value of the previous level are equal and the numerical value of the previous level equals zero, and
        if the numerical value of the current level and the numerical value of the previous level are equal and the numerical value of the previous level does not equal zero:
            a second stage of the persistent iteration is performed on one of the plurality of levels having those of the plurality of nodes with at least one child node not yet having the first stage of the persistent iteration performed thereon, and
        a third stage of the persistent iteration is performed on one of the plurality of levels having those of the plurality of nodes with all child nodes having the first stage of the persistent iteration performed thereon.

16. The computer program product of claim 15, further including a second executable portion for storing during the first stage of the persistent iteration at least a start node identification (ID) of one of the plurality of nodes indicating where the persistent iteration commenced, a current node identification (ID) of one of the plurality of nodes that is undergoing the persistent iteration, a parent node identification (ID) of the one of the plurality of nodes that is undergoing the persistent iteration, and a numerical value corresponding to at least the current level and those of the plurality of levels greater than the current level.

17. The computer program product of claim 16, further including a third executable portion for initializing the start node ID to be a root of one of at least the database tree structure and a sub-tree of the database tree structure.

18. The computer program product of claim 17, further including a third executable portion for performing the first stage of the persistent iteration by at least one of:
    initializing the parent node ID to be the start node ID,
    initializing the current node ID to a minimal node ID value, and
    initializing the numerical value for a pervious level to a zero value and the numerical value for the current level to a first value.

19. The computer program product of claim 15, further including a fourth executable portion for performing during the second stage of the persistent iteration at least one of:
    initializing the parent node ID to be the current node ID,
    initializing the current node ID to a minimal node ID value, and
    incrementing the numerical value for the current level by a value of one.

20. The computer program product of claim 15, further including a fourth executable portion for obtaining the node ID for a grandparent node of the current node ID during the third stage of the persistent iteration.

21. The computer program product of claim 15, further including a fourth executable portion for performing during the third stage of the persistent iteration at least one of:
    initializing the current node ID to be the parent node ID,
    initializing the parent node ID to be a grand parent node ID, and decrementing the numerical value for the current level and the numerical value for a previous level by a value of one.

\* \* \* \* \*